United States Patent [19]

Hattori et al.

[11] 4,304,576

[45] Dec. 8, 1981

[54] SILICON NITRIDE CERAMIC TOOLS AND A PROCESS FOR THEIR PRODUCTION

[75] Inventors: Yoshinori Hattori; Masayuki Akatsuka; Yasushi Matsuo; Isamu Fukuura, all of Nagoya, Japan

[73] Assignee: NGK Spark Plug Co., Ltd., Aichi, Japan

[21] Appl. No.: 91,662

[22] Filed: Nov. 5, 1979

[30] Foreign Application Priority Data

Nov. 4, 1978 [JP] Japan .................................. 53-136048

[51] Int. Cl.³ ......................... B24D 3/02; C04B 31/16
[52] U.S. Cl. ........................................ 51/309; 51/307; 51/308; 264/85; 501/97; 501/104
[58] Field of Search .......................... 51/307, 308, 309; 106/65, 57; 264/85

[56] References Cited

U.S. PATENT DOCUMENTS

| | | | |
|---|---|---|---|
| 3,903,230 | 9/1975 | Kamigaito et al. | 106/65 |
| 3,953,221 | 4/1976 | Lange | 106/65 |
| 4,073,845 | 2/1978 | Buljan et al. | 106/65 |

OTHER PUBLICATIONS

Kingery, W. D., Introduction to Ceramics, Wiley-Interscience Publication, p. 292.

Primary Examiner—Donald E. Czaja
Assistant Examiner—W. Thompson
Attorney, Agent, or Firm—Sughrue, Mion, Zinn, Macpeak and Seas

[57] ABSTRACT

A silicon nitride based ceramic tool is disclosed which is prepared from the starting powder compositions surrounded by and including the lines defined by the points A, B, and C and preferably D, E, and F in the FIGURE.

4 Claims, 1 Drawing Figure

U.S. Patent　　　　Dec. 8, 1981　　　　4,304,576
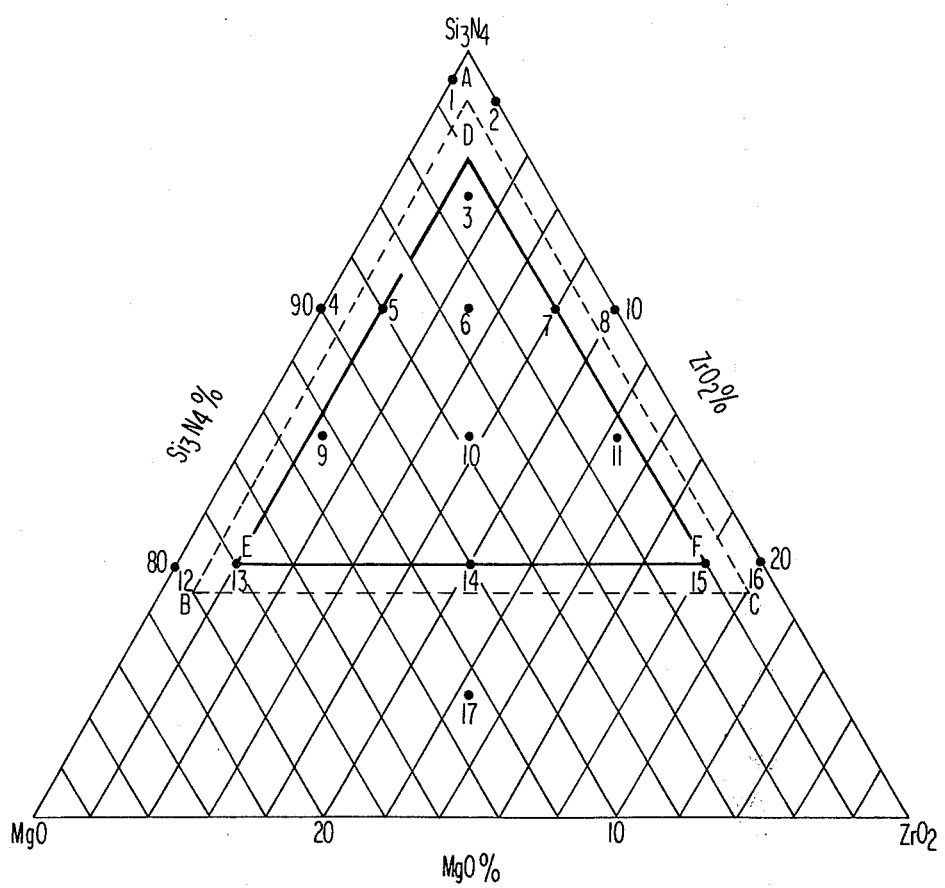

ured to chips
or cracks.

SILICON NITRIDE CERAMIC TOOLS AND A PROCESS FOR THEIR PRODUCTION

BACKGROUND OF THE INVENTION

1. Field of Invention

This invention relates to high durability ceramic tools comprising silicon nitride.

2. Description of the Prior Art

As ceramic tools for rough cutting castings at a speed as high as 100 m/min or more, tools produced by sintering through hot-pressing or hot isostatic pressing process (HIP process) have been primarily used. However, these tools tend to chip or crack during use which, in the case of cutting using an automatic cutting machine, has been the primary obstacle to operating efficiency. Also, the life of the tools is dominated by the chipping or cracking and, even when tools are worn only to a slight depth, they often have to be replaced due to chips or cracks.

As a result of intensive investigations to overcome the above defects, the inventors have discovered silicon nitrides having higher impact resistance, heat shock resistance, and durability than $Al_2O_3$ based materials.

Ceramics mainly comprising silicon nitride have a strong covalent bonding character and are difficult to sinter, and many studies have been made directed to their use as engineering ceramics such as in gas turbines. However, few have been applied as cutting tools.

The inventors have examined the characteristics of materials as cutting tools using MgO and stabilized $ZrO_2$ as sintering aids and, at last, have successfully overcome the defects of chipping and cracking during use, which have been the fatal defects of $Al_2O_3$ based ceramic tools.

SUMMARY OF THE INVENTION

A primary object of the present invention is to provide a silicon nitride ceramic tool suitable for use in an automatic cutting machine.

Another object of the present invention is to provide a silicon nitride material which resists cracking and chipping and is superior to $Al_2O_3$ based ceramics.

Still another object of the present invention is to provide a process for producing a silicon nitride ceramic tool from $Si_3N_4$, MgO, and stabilized $ZrO_2$ in well defined proportions.

Still a further object of the present invention is to provide a process for preparing silicon nitride based ceramic tools having high impact resistance, heat shock resistance and durability and suitable for rough cutting in automatic cutting machines.

The present invention resides in a process for producing highly durable ceramic tools, which comprises mixing $Si_3N_4$, MgO, and stabilized $ZrO_2$ powders in a mixing ratio falling within the area surrounded by and including the lines defined by the three points of A ($Si_3N_4$:98 wt %; MgO:1 wt %; $ZrO_2$:1 wt %), B ($Si_3N_4$:79 wt %; MgO:20 wt %; $ZrO_2$:1 wt %), and C ($Si_3N_4$:79 wt %; MgO:1 wt %; $ZrO_2$:20 wt %) shown in the attached triangular coordinate wherein the three coordinate axes indicate wt % of $Si_3N_4$, MgO, and stabilized $ZrO_2$, respectively; and hot-pressing the resulting mixture at about 1,600° to 1,850° C. at a pressure of not less than about 100 kg/cm² under non-oxidizing atmosphere.

BRIEF DESCRIPTION OF THE DRAWING

The FIGURE is a triangular coordinate showing the compounding ratios of the starting materials used to produce silicon nitride based ceramic tools in accordance with the present invention.

The present invention will be described in detail below.

DETAILED DESCRIPTION OF THE INVENTION

In the present invention, $Si_3N_4$, MgO, and $ZrO_2$ are the necessary starting materials, and $ZrO_2$ must be stabilized with $Y_2O_3$, CaO, or the like. Stabilized $ZrO_2$ is disclosed in W. D. Kingery et al, *Introduction to Ceramics*, page 292, Wiley-Interscience Publication. If non-stabilized $ZrO_2$ is used, it remains in a partially stabilized form or a monoclinic system in sintered products and, when the temperature of tool edge reaches higher than 1,000° C. upon cutting, it is converted to a high temperature tetragonal system accompanied by such an abnormal volume change that the sintered products suffer a reduction in resistance to chipping and cracking.

The three starting ingredients must be used in proportions within the area surrounded by and including the dotted lines drawn between the three points of A, B, and C, in the FIGURE and are preferably within the scope surrounded by and including the solid lines drawn between three points of D, E, and F shown. When the proportions are within this area, a large resistance to chipping results, whereas outside the area the resistance will seriously decrease. Roughly speaking, wear resistance tends to decrease with a reduction in the content of MgO.

The reason for the addition of $ZrO_2$ stabilized with $Y_2O_3$ or CaO to the mixture containing about 80% to 98% $Si_3N_4$ in an amount of about 1% to 20% is that when the amount is less than 1%, durability is not improved, whereas when it is more than 20%, a reduction in hardness results and such large wear occurs upon cutting that the materials cannot be used.

The basis for the content of $Si_3N_4$ is that when the content of $Si_3N_4$ is more than about 98%, such poor sintering properties result that the intended characteristics cannot be obtained, whereas when less than about 80%, there is a deterioration of wear resistance upon cutting.

The addition of MgO in an amount of about 1% to 20% is governed by the fact that when the content is less than about 1%, its effects as a sintering additive are insufficient, whereas when it is more than about 20%, increased wear occurs upon cutting, thus failing to provide the properties required as a cutting tool.

The preferred average particle size for each of $Si_3N_4$, $ZrO_2$ and MgO powders is about 1μ or less. After the three ingredient powders are mixed within the mixing proportion in the above-described range, the resulting mixture is hot-pressed at about 1,600° to 1,850° C. with a pressure of not less than about 100 kg/cm² under a non-oxidizing atmosphere. Sintering is conducted under a non-oxidizing atmosphere because silicon nitride is so readily oxidized. In addition, if the temperature is lower than about 1,600° C., in some cases, sintering is insufficient, whereas if higher than about 1,850° C., vaporization of $Si_3N_4$ becomes a problem.

EXAMPLE 1

A $Si_3N_4$ powder consisting of 90 wt % of $\alpha$-$Si_3N_4$ and 10 wt % of $\beta$-$Si_3N_4$, $ZrO_2$ stabilized with 20 mol % CaO, amd MgO were mixed in the mixing ratios shown in Table 1, then crushed using a ball mill to reduce the mean particle size to 1 micron. The thus obtained mixtures were dried to prepare the starting powders, and hot-pressed at the temperatures shown in Table 1 for 30 minutes at a pressure of 200 kg/cm$^2$ using a graphite mold, followed by abrading to prepare test pieces of 12.8×12.8×4.76 mm (SNP-432), 12.8×12.8×9.94 mm (SNP-455), and 4×8×25 mm to measure various physical properties. Additionally, the sintered products obtained were densely sintered with the exception of test pieces No. 1, No. 2, and No. 8.

The compositions of the starting powders are plotted in the FIGURE. (The numbers in the FIGURE correspond to the sample numbers in Table 1.)

The reason for this improvement is not clear, but it may be as follows: Firstly, in the intermittent cutting as shown in Table 1, the cutting edges are repeatedly heated to 1,000° C. or higher and, at that time, tools of the present invention containing mainly $Si_3N_4$ show a very low thermal expansion coefficient of about $3.5 \times 10^{-6}$/° C. as compared with tools of $Al_2O_3$-TiC based ceramics having a thermal expansion coefficient of about $7 \times 10^{-6}$/° C. As a result the tools of the present invention have a strong heat shock resistance. Secondly, micro-structural observation of the tools mainly containing $Si_3N_4$ reveals a fibrous structure, which seems to contribute to high toughness.

EXAMPLE 2

Test pieces for comparison (Sample No. 6R) were prepared using the same composition as sample No. 6 in Example 1 except using non-stabilized monoclinic zirconia in place of the stabilized zirconia. Ten test pieces

TABLE 1

| Sample No. | Composition Si$_3$N$_4$ | ZrO$_2$ | MgO | Sintering Temp. (°C.) | Flexural[2] Strength (Kg/mm$^2$) | Hardness[3] (45N) | Wear Resistance[4] (V$_8$ mm) | Dulability[5] | Note |
|---|---|---|---|---|---|---|---|---|---|
| 1* | 99 | 0 | 1 | 1,850 | 51 | 84.1 | 0.55 | 10 | serious wear |
| 2* | 99 | 2 | 0 | 1,850 | 40 | 82.0 | 0.72 | 5 | serious wear |
| 3 | 95 | 2.5 | 2.5 | 1,850 | 82 | 88.0 | 0.08 | 153 | |
| 4* | 90 | 0 | 10 | 1,750 | 78 | 88.6 | 0.08 | 46 | |
| 5 | 90 | 2 | 8 | 1,800 | 80 | 88.5 | 0.09 | 162 | |
| 6 | 90 | 5 | 5 | 1,800 | 91 | 87.7 | 0.09 | >200 | |
| 6' | 90 | 5[1] | 5 | 1,800 | 85 | 88.2 | 0.21 | 197 | |
| 7 | 90 | 8 | 2 | 1,800 | 75 | 87.3 | 0.12 | >200 | |
| 8* | 90 | 10 | 0 | 1,800 | 63 | 85.4 | 0.25 | 47 | serious wear |
| 9 | 85 | 2.5 | 12.5 | 1,800 | 81 | 87.2 | 0.10 | 175 | |
| 10 | 85 | 7.5 | 7.5 | 1,800 | 87 | 86.9 | 0.12 | >200 | |
| 11 | 85 | 12.5 | 2.5 | 1,800 | 79 | 86.2 | 0.14 | >200 | |
| 12* | 80 | 0 | 20 | 1,700 | 70 | 87.2 | 0.13 | 50 | |
| 13 | 80 | 2 | 18 | 1,700 | 78 | 86.7 | 0.13 | 156 | |
| 14 | 80 | 10 | 10 | 1,750 | 84 | 86.2 | 0.15 | >200 | |
| 15 | 80 | 18 | 2 | 1,800 | 75 | 86.0 | 0.16 | >200 | |
| 16* | 80 | 20 | 0 | 1,800 | 63 | 84.4 | 0.28 | 41 | serious wear |
| 17* | 75 | 12.5 | 12.5 | 1,750 | 76 | 85.3 | 0.24 | 63 | serious wear |
| 18* | Al$_2$O$_3$ - TiC based ceramic | | | | 80 | 91.2 | 0.10 | 62 | |

*Outside the present invention.
[1]ZrO$_2$ stabilized with Y$_2$O$_3$ instead of CaO.
[2]Measured in accordance with JIS B-4104 using 2.4 × 8 × 25 mm test pieces.
[3]Measured under a load of 45 kg using Super-Fischer hardness tester.
[4]SNP-432 test pieces having a chamfer of 0.2 were used. 100 φ mm × 500 l mm materials were cut under the cutting conditions of 400 m/min cutting speed, 1.0 mm in cut depth, 0.2 mm/rev in feeding speed, and 400 mm in cutting length to measure Frank wear depth.
[5]Sheets cut without cracking. SNP-455 test pieces having a chamfer of 0.2 were used. FC-20 materials were cut at a cutting speed of 500 m/min. The cuts were 2.2–3.0 mm in depth. The outside of discs 200 mm in outer diameter and 35 mm in thickness were cut at a speed of 0.3 mm/rev.

As is shown in Table 1, ceramic tools obtained by the present invention are excellent in toughness, particularly in resistance to chipping when rough cutting castings, and greatly improve the durability of tools in automatic machines.

were prepared to examine the number of sheets of products cut without chipping and cracking. The results are shown in Table 2 together with the results of Sample No. 6.

TABLE 2

| Sample No. | Composition | | Hot-pressing Conditions | Flexural Strength (kg/mm$^2$) | Hardness (45 N) | Wear Resistance (V$_8$ mm) | Durability |
|---|---|---|---|---|---|---|---|
| 6 | Si$_3$N$_4$ Stabilized ZrO$_2$ MgO | 90% 5% 5% | Temp.: 1800° C. Pressure: 200 kg/cm$^2$ Time: 30 min. | 91 | 87.7 | 0.09 | All 10 test pieces cut more than 200 products. |
| 6R | Si$_3$N$_4$ ZrO$_2$ MgO | 90% 5% 5% | Temp.: 1800° C. Pressure: 200 kg/cm$^2$ Time: 30 min. | 95 | 87.8 | 0.09 | One test piece cut 41 products, a second test piece 48, a third 53, a fourth 87, a fifth 90, a sixth 130, a 7th 180, and the rest |

TABLE 2-continued

| Sample No. | Composition | Hot-pressing Conditions | Flexural Strength (kg/mm$^2$) | Hardness (45 N) | Wear Resistance (V$_8$ mm) | Durability |
|---|---|---|---|---|---|---|
| | | | | | | >200. |

As is clear from Table 2, although there were no differences between the two in flexural strength, hardness, and wear resistance, the number of sheets of products cut without chipping and cracking were different as follows. That is, all 10 test pieces of No. 6 could cut more than 200 products, whereas only three test pieces of No. 6R could cut more than 200 products, with other test pieces cutting only 41-189 products. The reason therefor is not clear, but, judging X-ray diffraction reveals the existence of a small amount of monoclinic system low temperature type ZrO$_2$ in the No. 6R test pieces, whereas only stabilized ZrO$_2$ is detected in No. 6 test pieces of the present invention.

Modern machine tools are all automatically operated, and abrupt chipping or cracking of tools created serious problems, and hence stable tools in accordance with the present invention have great advantages over Sample No. 6R showing varied resistance against chipping and cracking. Additionally, when thermal expansion at room temperature to 1,200° C. was examined, Sample No. 6R showed a variation in thermal expansion coefficient between 900° C. and 1,000° C., whereas Sample No. 6 showed a linear expansion curve without variation.

The above-described excellent physical properties of the ceramic tools obtained in accordance with the present invention enables their application to cutting tools used for metals other than castings, such as aluminum and steel and, further, to heat-resistance members for machine parts which are vibrated or heated during cutting.

While the invention has been described in detail and with reference to specific embodiments thereof, it will be apparent to one skilled in the art that various changes and modifications can be made therein without departing from the spirit and scope thereof.

What is claimed is:

1. A process for producing high durability ceramic tools, which comprises mixing Si$_3$N$_4$, MgO, and stabilized zirconia powders stabilized with Y$_2$O$_3$ or CaO in a mixing ratio falling within the area surrounded by and including the lines drawn between the three points of A (Si$_3$N$_4$:98 wt %; MgO:1 wt %; ZrO$_2$:1 wt %), B (Si$_3$N$_4$:79 wt %; MgO:20 wt %; ZrO$_2$:1 wt %), and C (Si$_3$N$_4$:79 wt %; MgO:1 wt %, ZrO$_2$:20 wt %) in triangular coordinates as shown in the FIGURE of the Drawing wherein the three coordinate axes indicate the weight percent Si$_3$N$_4$, MgO, and stabilized ZrO$_2$, respectively, and hot-pressing the resulting mixture at about 1,600° to 1,850° C. at a pressure of not less than about 100 kg/cm$^2$ under a non-oxidizing atmosphere.

2. The process of claim 1, wherein Si$_3$N$_4$, MgO, and stabilized ZrO$_2$ powders are mixed in a mixing ratio in the area surrounded by and including the lines drawn between the three points of D (Si$_3$N$_4$:96 wt %; MgO:2 wt %; ZrO$_2$:2 wt %), E (Si$_3$N$_4$:80 wt %; MgO:18 wt %; ZrO$_2$:2 wt %), and F (Si$_3$N$_4$:80 wt %; MgO:2 wt %; ZrO$_2$:18 wt %) in triangular coordinates as shown in the FIGURE.

3. The ceramic tool prepared by the process of claim 1.

4. The ceramic tool prepared by the process of claim 2.

* * * * *